(12) United States Patent
Kikuchi

(10) Patent No.: US 9,893,581 B2
(45) Date of Patent: Feb. 13, 2018

(54) ROTOR, AND PERMANENT-MAGNET-TYPE ROTATIONAL ELECTRIC MACHINE, ELECTRIC DRIVE SYSTEM, AND ELECTRIC VEHICLE WHICH ARE PROVIDED WITH SAID ROTOR

(71) Applicant: Hitachi Automotive Systems, Ltd., Hitachinaka-shi, Ibaraki (JP)

(72) Inventor: Satoshi Kikuchi, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/102,280

(22) PCT Filed: Nov. 12, 2014

(86) PCT No.: PCT/JP2014/079907
§ 371 (c)(1),
(2) Date: Jun. 7, 2016

(87) PCT Pub. No.: WO2015/098326
PCT Pub. Date: Jul. 2, 2015

(65) Prior Publication Data
US 2017/0033624 A1 Feb. 2, 2017

(30) Foreign Application Priority Data

Dec. 27, 2013 (JP) ................. 2013-270812

(51) Int. Cl.
*H02K 1/27* (2006.01)
*B60L 3/00* (2006.01)
(Continued)

(52) U.S. Cl.
CPC .......... *H02K 1/2766* (2013.01); *B60L 3/0061* (2013.01); *B60L 11/123* (2013.01);
(Continued)

(58) Field of Classification Search
CPC ...... H02K 1/2766; H02K 3/12; B60L 3/0061; B60L 11/123; B60L 11/14; B60L 11/1864; B60L 15/007
See application file for complete search history.

(56) References Cited

U.S. PATENT DOCUMENTS 6,177,745 B1 * 1/2001 Narita .................. H02K 1/2766
310/156.43
6,300,700 B1 * 10/2001 Nishiyama ............. H02K 1/148
310/156.38
(Continued)

FOREIGN PATENT DOCUMENTS

EP 2 264 859 A1 12/2010
EP 3 073 614 A1 9/2016
(Continued)

OTHER PUBLICATIONS

Machine translation of Hamahata Sadahiro, WO 2013161474 A1.*
(Continued)

*Primary Examiner* — Naishadh Desai
(74) *Attorney, Agent, or Firm* — Crowell & Moring LLP

(57) ABSTRACT

A permanent magnet type rotational electric machine for an electric vehicle capable of ensuring an electric power generation torque or a peak torque instantaneously assisting a torque of an engine even by using a rare earth-less magnet and also capable of ensuring characteristics for high speed driving is provided. A rotator includes permanent magnets of which at least one side in an axial direction cross section is formed in an arc shape, and includes a plurality of permanent magnets, wherein where a center axis of a magnetic pole is denoted as d axis, and an axis that is 90 degrees from the d axis in an electrical angle is denoted as q axis, the rotator for the permanent magnet type rotational electric machine includes a first permanent magnet pair in which a line connecting a center point of the arc and the arc does not
(Continued)

cross the d axis, and a second permanent magnet pair in which the line crosses the d axis.

8 Claims, 7 Drawing Sheets

(51) Int. Cl.
  *B60L 11/12* (2006.01)
  *B60L 11/14* (2006.01)
  *B60L 11/18* (2006.01)
  *B60L 15/00* (2006.01)
  *H02K 3/12* (2006.01)

(52) U.S. Cl.
  CPC ........... *B60L 11/14* (2013.01); *B60L 11/1864* (2013.01); *B60L 15/007* (2013.01); *H02K 3/12* (2013.01); *B60L 2210/40* (2013.01); *B60L 2220/50* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2260/28* (2013.01); *H02K 2213/03* (2013.01); *Y02T 10/6217* (2013.01); *Y02T 10/641* (2013.01); *Y02T 10/645* (2013.01); *Y02T 10/7005* (2013.01); *Y02T 10/7061* (2013.01); *Y02T 10/7077* (2013.01); *Y02T 10/7241* (2013.01)

(56) References Cited

U.S. PATENT DOCUMENTS

| | | | |
|---|---|---|---|
| 6,717,315 B1 | 4/2004 | Tajima et al. | |
| 2008/0278102 A1* | 11/2008 | Taniguchi | B62D 5/046 318/400.27 |
| 2012/0175988 A1* | 7/2012 | Hino | H02K 1/276 310/156.38 |
| 2013/0015727 A1* | 1/2013 | Iki | H02K 1/246 310/49.43 |
| 2013/0320797 A1 | 12/2013 | Vyas et al. | |
| 2015/0115758 A1 | 4/2015 | Koka et al. | |

FOREIGN PATENT DOCUMENTS

| | | | | |
|---|---|---|---|---|
| JP | 2009-153353 A | 7/2009 | | |
| JP | 2012-29563 A | 2/2012 | | |
| JP | 2013-225997 A | 10/2013 | | |
| JP | 2013-251948 A | 12/2013 | | |
| WO | WO 01/43259 A1 | 6/2001 | | |
| WO | WO 2013161474 A1 * | 10/2013 | ........... | H02K 1/2766 |

OTHER PUBLICATIONS

International Search Report (PCT/ISA/210) issued in PCT Application No. PCT/JP2014/079907 dated Feb. 3, 2015 with English translation (6 pages).
Japanese-language Written Opinion (PCT/ISA/237) issued in PCT Application No. PCT/JP2014/079907 dated Feb. 3, 2015 (5 pages).
Extended European Search Report issued in counterpart European Application No. 14873685.3 dated Jul. 7, 2017 (Fifteen (15) pages).

* cited by examiner

ROTOR, AND PERMANENT-MAGNET-TYPE ROTATIONAL ELECTRIC MACHINE, ELECTRIC DRIVE SYSTEM, AND ELECTRIC VEHICLE WHICH ARE PROVIDED WITH SAID ROTOR

TECHNICAL FIELD

The present invention relates to a rotator, and a permanent magnet type rotational electric machine, an electric drive system, and an electric vehicle having the same.

BACKGROUND ART

Rotational electric machines for vehicles, such as driving motors of hybrid electric vehicles and the like require acceleration performance such as startup, overtaking, and the like, and therefore, motors are required to have a high instantaneous peak torque. In a case of permanent magnet type rotational electric machines used for the purpose of automobiles, rare earth magnets having a high magnetic energy product are employed as permanent magnets used for the rotators generating this peak torque. In this case, dysprosium is added to the rare earth magnet used for the purpose of automobiles in order to withstand a high temperature environment. However, there is a high risk of resource depletion of the dysprosium, and therefore, application of rare earth-less magnets having less amounts of readily available permanent magnet materials, e.g., ferrite magnets and dysprosium, applied therein, is being reviewed from the perspective of avoiding risks.

In a case where a rare earth-less magnet is applied, the magnetic energy product is lower than the rare earth magnet, and therefore, it is necessary to pass a large electric current. For this reason, a high circuit loss occurs in a switching device of an inverter and a bus bar, and therefore, since it is necessary to take countermeasures to the heat, it is desired to reduce the electric current in the inverter when a peak torque is generated, i.e., it is desired to improve the torque characteristics of the motor.

As an example of a countermeasure, PTL 1 discloses a technique for changing the magnetic domain orientation of the permanent magnet in the circumferential direction to increase the effective magnetic flux, thus improving the torque, i.e., the efficiency.

CITATION LIST

Patent Literature

PTL 1: Japanese Patent Laid-Open No. 2009-153353

SUMMARY OF INVENTION

Technical Problem

In the above conventional technique, the magnetic domain orientation of the permanent magnet is changed in the peripheral direction, so that the short-circuiting magnetic flux that occurs between magnets is suppressed, and there is an effect of increasing the effective magnetic flux of the permanent magnet. In a case where a permanent magnet having a small magnetic energy product is configured, it is necessary to ensure the effective magnetic flux, and therefore, this can be said to be a technique preferable for making use of the rare earth-less magnet.

When the effective magnetic flux can be ensured, the torque can be improved, and an electric current value required for generating the torque can be reduced, and the efficiency can be improved.

However, even though the torque can be improved in a low-speed range such as during acceleration of a vehicle generating a peak torque, the magnetic domain orientation of the permanent magnet is different in the peripheral direction in a driving condition that requires a weak field driving such as a high speed cruising, and therefore, in the weak field driving, the distributions of the armature magnetomotive force and the field magnetomotive force are different, and this increases the weak field electric current, and this makes a harmonic magnetomotive force component more obvious. As a result, this increases motor losses such as a copper loss in an armature winding wire and a steel loss due to harmonics, and this may increase the fuel consumption amount of the vehicle.

It is an object of the present invention to provide a permanent magnet type rotational electric machine for an electric vehicle capable of ensuring a peak torque or an electric power generation torque for instantaneously assisting the torque of the engine and capable of ensuring the characteristics during high speed driving even when a rare earth-less magnet is used.

Solution to Problem

In order to solve the above problems, for example, a configuration described in claims is employed. The present application includes a plurality of means to solve the above problems, and an example thereof is a rotator for a permanent magnet type rotational electric machine, wherein the rotator includes a permanent magnet of which at least one side in an axial direction cross section is formed in an arc shape, and includes a plurality of permanent magnets, where a center axis of a magnetic pole is denoted as d axis, and an axis that is 90 degrees from the d axis in an electrical angle is denoted as q axis, the rotator includes a first permanent magnet pair in which a line connecting a center point of the arc and the arc does not cross the d axis, and a second permanent magnet pair in which the line crosses the d axis.

Advantageous Effects of Invention

According to the present invention, a permanent magnet type rotational electric machine capable of ensuring a peak torque or an electric power generation torque for instantaneously assisting the torque of the engine and capable of ensuring the characteristics during high speed driving and having superior characteristics in a driving system even when a rare earth-less magnet is used.

Problems, configurations, and effects other than those described above will be understood from the following explanation about embodiments.

DESCRIPTION OF EMBODIMENTS

Hereinafter, an embodiment of the present invention will be explained by using, for example, a driving motor used in a hybrid electric vehicle.

First Embodiment

Figure 1:
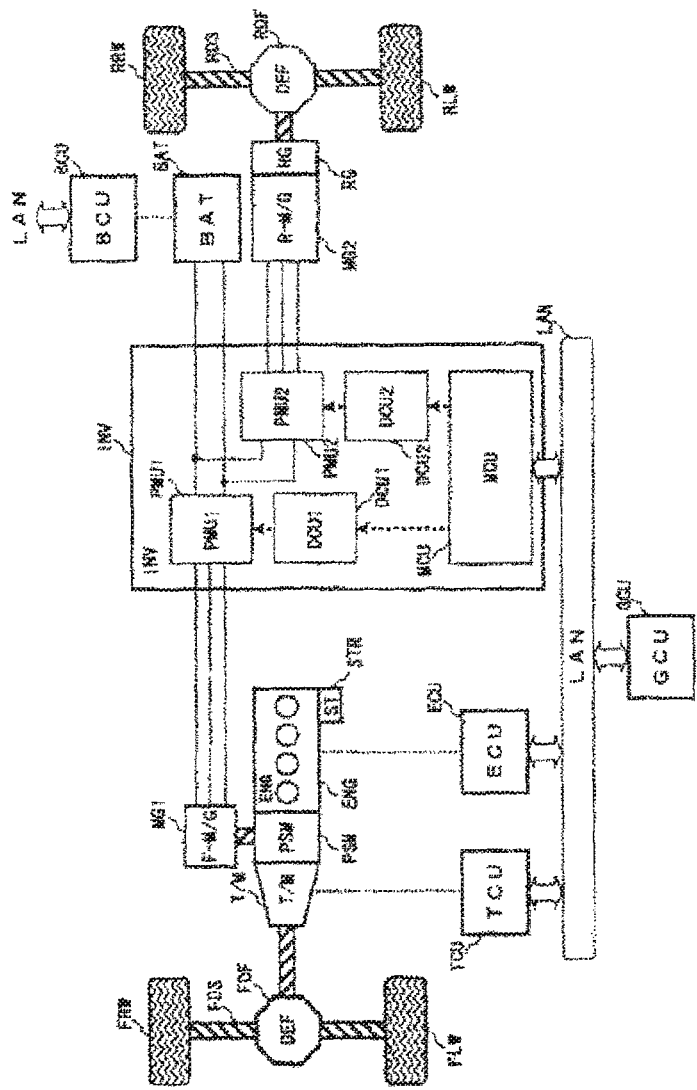
FIG. 1 is a block diagram illustrating a configuration of a hybrid electric vehicle to which a rotational electric machine according to an embodiment of the present invention is applied.

First, a configuration of a vehicle to which the rotational electric machine of the present embodiment is applied will be explained with reference to FIG. 1. In the present embodiment, a hybrid electric vehicle having two different power sources will be explained as an example.

The hybrid electric vehicle according to the present embodiment is a four wheel drive type configured so that front wheels FLW, FRW are driven by an engine ENG which is an internal combustion engine and a rotational electric machine MG1, and rear wheels RLW, RRW are driven by a rotational electric machine MG2.

In the present embodiment, the case where the front wheels WFLW, FRW are driven by the engine ENG and the rotational electric machine MG1, and the rear wheels RLW, RRW are driven by the rotational electric machine MG2 will be explained. Alternatively, the front wheels WFLW, FRW may be driven by the rotational electric machine MG1, and the rear wheels RLW, RRW may be driven by the engine ENG and the rotational electric machine MG2.

A front wheel axle FDS of the front wheels FLW, FRW are mechanically connected via a differential apparatus FDF to a transmission T/M. The transmission T/M is mechanically connected via a power distribution mechanism PSM to the rotational electric machine MG1 and the engine ENG. The power distribution mechanism PSM is a mechanism for combining and distribution of the rotation driving force. A stator winding wire of the rotational electric machine MG1 is electrically connected to the alternating current side of the inverter device INV. The inverter device INV is an electric power conversion apparatus converting a direct current electric power into a three-phase alternating current electric power, and is configured to control driving of the rotational electric machine MG1. A battery BAT electrically connected to the direct current side of the inverter device INV.

A rear wheel axle RDS of the rear wheels RLW, RRW is mechanically connected via the differential apparatus RDF and the reduction gear RG to the rotational electric machine MG2. The stator winding wire of the rotational electric machine MG2 is electrically connected to the alternating current side of the inverter device INV. In this case, the inverter device INV is commonly used with the rotational electric machines MG1, MG2, and includes a power module PMU1 and a driving circuit device DCU1 for the rotational electric machine MG1, a power module PMU2 and a driving circuit device DCU2 for the rotational electric machine MG2, and a motor control unit MCU.

A starter STR is attached to the engine ENG. The starter STR is a starting apparatus for stating the engine ENG.

The engine control device ECU calculates control values for operating component devices (such as a throttle valve, a fuel injection valve, and the like) of the engine ENG on the basis of input signals from sensors, other control apparatuses, and the like. This control value is output, as a control signal, to the driving apparatus of each component device of the engine ENG. Accordingly, operation of each component device of the engine ENG is controlled.

The operation of the transmission T/M is controlled by the transmission control device TCU. The transmission control device TCU calculates a control value for operating the transmission mechanism on the basis of input signals from sensors, other control apparatuses, and the like. This control value is output, as a control signal, to the driving apparatus of the transmission mechanism. Accordingly, operation of the transmission mechanism of the transmission T/M is controlled.

The battery BAT is a lithium ion battery of which battery voltage is a high voltage equal to or more than 200v, and the charge, discharge, the lifetime, and the like are controlled by the battery control device BCU. The battery control device BCU receives the voltage value, the electric current value, and the like of the battery BAT in order to manage the charge, discharge, the lifetime, and the like of the battery. Although not shown in the drawings, a low voltage battery having a battery voltage of 12v is also provided as a battery, and is used for an electric power source of a control system and an electric power source for a radio, lightings, and the like.

The engine control device ECU, the transmission control device TCU, the motor control unit MCU, and the battery control device BCU are electrically connected with each other via an onboard local area network LAN, and is electrically connected to the general control device GCU. This enables bidirectional signal transmission between the control apparatuses, so that, i.e., information can be transmitted to each other, and detection values can be shared. The general control device GCU outputs a command signal to each control device in accordance with the driving state of the vehicle. For example, the general control device GCU calculates a required torque value for the vehicle in accordance with the amount of depression of the acceleration pedal on the basis of an acceleration request of the driver, this required torque value is distributed between the output torque value at the side of the engine ENG and the output torque value at the distributed of the rotational electric machine MG1 so as to improve the operation efficiency of the engine ENG, and the output torque value distributed for the engine ENG is output, as an engine torque command signal, to the engine control device ECU, and the output torque value distributed at the side of the rotational electric machine MG1 side is output, as a motor torque command signal, to the motor control unit MCU.

Subsequently, operation of the hybrid electric vehicle according to the present embodiment will be explained.

When the hybrid electric vehicle starts to drive, the front wheels FLW, FRW are driven by the rotational electric machine MG1 during low speed driving (in a range in which the operation efficiency (fuel efficiency) of the engine ENG is low). In the present embodiment, the front wheels FLW, FRW are driven by the rotational electric machine MG1 when the hybrid electric vehicle starts to drive and during low speed driving. Alternatively, the front wheels FLW, FRW may be driven by the rotational electric machine MG1, and the rear wheels RLW, RRW may be driven by the rotational electric machine MG2 (the vehicle may run with four wheel driving). A direct current electric power is provided to the inverter device INV from the battery BAT. The provided direct current electric power is converted by the inverter device INV into a three-phase alternating current electric power. The three-phase alternating current electric power thus obtained is provided to the stator winding wire of the rotational electric machine MG1. Accordingly, the rotational electric machine MG1 is driven, and the rotation output is generated. This rotation output is input via the power distribution mechanism PSM into the transmission T/M. The speed of the received rotation output is varied by the transmission T/M, and the rotation output is input into the differential apparatus FDF. The received rotation output is distributed to the right and the left by the differential apparatus FDF, and transmitted to the right and left front wheel axle FDS. Accordingly, the front wheel axle FDS is rotationally driven. Then, the front wheels FLW, FRW are rotationally driven by the rotation driving of the front wheel axle FDS.

During normal cruising of the hybrid electric vehicle (in a driving range where the vehicle cruises on a dry road surface and in which the operation efficiency of the engine ENG is good (low fuel consumption)), the front wheels FLW, FRW are driven by the engine ENG. Accordingly, the rotation output of the engine ENG is input via the power distribution mechanism PSM into the transmission T/M. The speed of the received rotation output is varied by the transmission T/M. The rotation output of which speed has been varied is transmitted via the differential apparatus FDF to the front wheel axle FDS. Accordingly, the front wheels FLW, FRW are rotationally driven by WH-F. The charging state of the battery BAT is detected, and in a case where it is necessary to charge the battery BAT, the rotation output of the engine ENG is distributed via the power distribution mechanism PSM to the rotational electric machine MG1, so that the rotational electric machine MG1 is rotationally driven. Accordingly, the rotational electric machine MG1 operates as an electric power generator. With this operation, a three-phase alternating current electric power is generated in the stator winding wire of the rotational electric machine MG1. This generated three-phase alternating current electric power is converted into a predetermined direct current electric power by the inverter device INV. The direct current electric power obtained from this conversion is provided to the battery BAT. As a result, the battery BAT is charged.

During four wheel driving of the hybrid electric vehicle (in a driving range where the vehicle cruises on a low μ surface such as snow-covered road and in which the operation efficiency of the engine ENG is good (low fuel consumption)), the rear wheels RLW, RRW are driven by the rotational electric machine MG2. Like the above normal cruising, the front wheels FLW, FRW are driven by the engine ENG. Further, the amount of electricity accumulated in the battery BAT decreases as the rotational electric machine MG1 operates, and therefore, like the above normal cruising, the rotational electric machine MG1 is rotationally driven by the rotation output of the engine ENG, so that the battery BAT is charged. A direct current electric power is provided to the inverter device INV from the battery BAT in order to drive the rear wheels RLW, RRW with the rotational electric machine MG2. The provided direct current electric power is converted by the inverter device INV into a three-phase alternating current electric power, and the alternating current electric power thus converted is provided to the stator winding wire of the rotational electric machine MG2. Therefore, the rotational electric machine MG2 is driven, and the rotation output is generated. The speed of the generated rotation output is decelerated by the reduction gear RG, and the rotation output is input into the differential apparatus RDF. The received rotation output is distributed to the right and the left by the differential apparatus RDF, and transmitted to the right and left rear wheel axle RDS. Accordingly, the rear wheel axle RDS is rotationally driven. Then, the rear wheels RLW, RRW are rotationally driven by the rotation driving of the rear wheel axle RDS.

During acceleration of the hybrid electric vehicle, the front wheels FLW, FRW are driven by the engine ENG and the rotational electric machine MG1. In the present embodiment, the front wheels FLW, FRW are driven by the engine ENG and the rotational electric machine MG1 during acceleration of the hybrid electric vehicle. Alternatively, the front wheels FLW, FRW and driven by the engine ENG and the rotational electric machine MG1, and the rear wheels RLW, RRW may be driven by the rotational electric machine MG2 (the vehicle may run with four wheel driving). The rotation outputs of the engine ENG and the rotational electric machine MG1 are input via the power distribution mechanism PSM into the transmission T/M. The speed of the received rotation output is varied by the transmission T/M. The rotation output of which speed has been varied is transmitted via the differential apparatus FDF to the front wheel axle FDS. Accordingly, the front wheels FLW, FRW is rotationally driven.

During regeneration of the hybrid electric vehicle (during deceleration, e.g., when the brake pedal is depressed, when depressing of the brake pedal is loosened, or when the driver is no longer depressing the brake pedal), the rotation forces of the front wheels FLW, FRW are transmitted via the front wheel axle FDS, the differential apparatus FDF, the transmission T/M, and the power distribution mechanism PSM to the rotational electric machine MG1, and the rotational electric machine MG1 is rotationally driven. Accordingly, the rotational electric machine MG1 operates as an electric power generator. With this operation, a three-phase alternating current electric power is generated in the stator winding wires of the rotational electric machine MG1. The three-phase alternating current electric power thus generated is converted by the inverter device INV into a predetermined direct current electric power. The direct current electric power obtained from this conversion is provided to the battery BAT. As a result, the battery BAT is charged. On the other hand, the rotation forces of the rear wheels RLW, RRW are transmitted via the rear wheel axle RDS, the differential apparatus RDF, and the reduction gear RG to the rotational electric machine MG2, so that the rotational electric machine MG2 is rotationally driven. Accordingly, the rotational electric machine MG2 operates as an electric power generator. With this operation, a three-phase alternating current electric power is generated in the stator winding wire of the rotational electric machine MG2. The three-phase alternating current electric power thus generated is converted by the inverter device INV into a predetermined direct current electric power. The direct current electric power obtained from this conversion is provided to the battery BAT. As a result, the battery BAT is charged.

Figure 2:
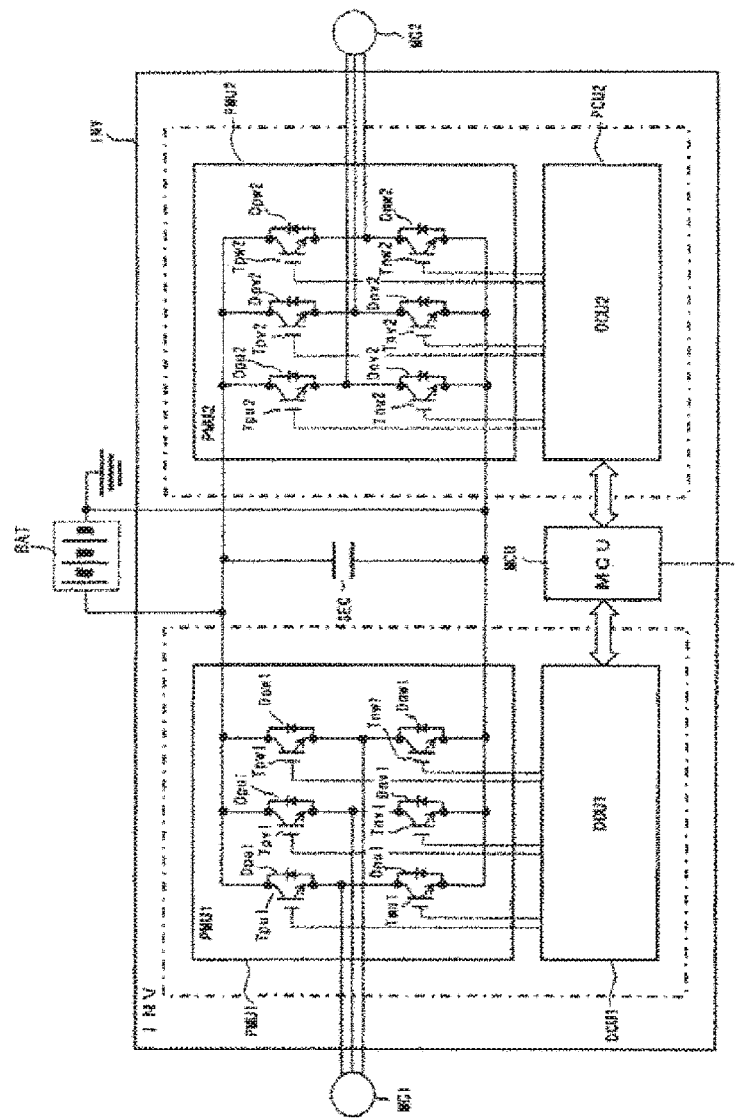
FIG. 2 is a circuit diagram illustrating a circuit configuration of an inverter device.

FIG. 2 illustrates a configuration of the inverter device INV according to the present embodiment.

As described above, the inverter device INV includes the power modules PMU1, PMU2, the driving circuit devices DCU1, DCU2, and the motor control unit MCU. The power modules PMU1, PMU2 have the same configuration. The driving circuit devices DCU1, DCU2 have the same configuration.

The power modules PMU1, PMU2 convert the direct current electric power provided from the battery BAT into an alternating current electric power, and constitute a conversion circuit (which may be also referred to as a main circuit) providing the alternating current electric power to the rotational electric machines MG1, MG2 corresponding thereto. The conversion circuit can also convert the alternating current electric power provided from the corresponding rotational electric machines MG1, MG2 into a direct current electric power, and provide the direct current electric power to the battery BAT.

The conversion circuit is a bridge circuit, and is configured such that a series circuit for three phases is connected electrically in parallel between a positive electrode side and a negative electrode side of the battery BAT. The series circuit is also referred to as an arm, and is constituted by two semiconductor devices.

The arm is configured such that, for each phase, a power semiconductor device for an upper arm side and a power semiconductor device for a lower arm side are electrically connected in series. In the present embodiment, an IGBT (insulated-gate bipolar transistor) which is a switching semiconductor device is used as a power semiconductor device. A semiconductor chip constituting an IGBT includes three electrodes, i.e., a collector electrode, an emitter electrode, and a gate electrode. A diode which is a different chip from the IGBT is electrically connected between the collector electrode and the emitter electrode of the IGBT. The diode is electrically connected between the emitter electrode and the collector electrode of the IGBT in such a manner that a direction from the emitter electrode and the collector electrode of the IGBT is a forward direction. Instead of the IGBT, a MOSFET (metal oxide semiconductor-type field effect transistor) may be used as the power semiconductor device. In this case, the diode is omitted.

The emitter electrode of the power semiconductor device Tpu1 and the collector electrode of the power semiconductor device Tnu1 are electrically connected in series, so that a u-phase arm of the power module PMU1 is configured. The v-phase arm and the w-phase arm are configured in the same manner as the u-phase arm. The emitter electrode of the power semiconductor device Tpv1 and the collector electrode of the power semiconductor device Tnv1 are electrically connected in series, so that the v-phase arm of the power module PMU1 is configured, and the emitter electrode of the power semiconductor device Tpw1 and the collector electrode of the power semiconductor device Tnw1 are electrically connected in series, so that the w-phase arm of the power module PMU1 is configured. In the power module PMU2, the arm of each phase is configured in the same connection relationship as the power module PMU1 explained above.

The collector electrodes of the power semiconductor devices Tpu1, Tpv1, Tpw1, Tpu2, Tpv2, Tpw2 are electrically connected to a high potential side (positive electrode side) of the battery BAT. The emitter electrodes of the power semiconductor devices Tnu1, Tnv1, Tnw1, Tnu2, Tnv2, Tnw2 are electrically connected to a low potential side (negative electrode side) of the battery BAT.

A midpoint (a connecting portion between the emitter electrode of the upper arm side power semiconductor device and the collector electrode of the lower arm side power semiconductor electrode in each of the arms) of the u-phase arm (the v-phase arm and the w-phase arm) of the power module PMU1 is electrically connected to the stator winding wire of the u-phase (the v-phase and the w-phase) of the rotational electric machine MG1.

A midpoint (a connecting portion between the emitter electrode of the upper arm side power semiconductor device and the collector electrode of the lower arm side power semiconductor electrode in each of the arms) of the u-phase arm (the v-phase arm and the w-phase arm) of the power module PMU2 is electrically connected to the stator winding wire of the u-phase (the v-phase and the w-phase) of the rotational electric machine MG2.

A smoothing electrolytic capacitor SEC is electrically connected between the positive electrode side and negative electrode side of the battery BAT in order to suppress variations in direct current voltage caused by the operation of the power semiconductor devices.

The driving circuit devices DCU1, DCU2 are configured as drive units adapted to output, on the basis of the control signals that are output from the motor control unit MCU, drive signals for operating the power semiconductor devices of the power modules PMU1, PMU2, thereby operating the power semiconductor devices. In addition, the driving circuit devices DCU1, DCU2 are each composed of circuit components such as an insulated electric power source, an interface circuit, a driving circuit, a sensor circuit, and a snubber circuit (not shown).

The motor control unit MCU is an arithmetic device composed of a microcomputer. The motor control unit MCU receives a plurality of input signals and outputs, to the driving circuit devices DSU1, DSU2, control signals for operating the power semiconductor devices of the power modules PMU1, PMU2. The motor control unit MCU receives, as the input signals, torque command values $\tau*1$, $\tau*2$, current detection signals iu1 to iw1, iu2 to iw2, and magnetic pole position signals $\theta1$, $\theta2$.

The torque command values $\tau*1$, $\tau*2$ are output from an upper control device in response to the operation mode of the vehicle. The torque command value $\tau*1$ corresponds to the rotational electric machine MG1 and the torque command value $\tau*2$ corresponds to the rotational electric machine MG2. The electric current detection signals iu1 to Iw1 are detection signals of input electric currents of u-phase to w-phase supplied from the conversion circuit of the inverter device INV to the stator winding wires of the rotational electric machine MG1. The electric current detection signals iu1 to Iw1 are each detected by an electric current sensor such as a current transformer (CT). The electric current detection signals iu2 to Iw2 are detection signals of input electric currents of u-phase to w-phase supplied from the inverter device INV to the stator winding wires of the rotational electric machine MG2. The electric current detection signals iu2 to Iw2 are each detected by an electric current sensor such as a current transformer (CT). A magnetic pole position detection signal $\theta1$ is a detection signal of a magnetic pole position of the rotation of the rotational electric machine MG1 and is detected by a magnetic pole position sensor such as a resolver, an encoder, a Hole element, a Hole IC or the like. A magnetic pole position detection signal $\theta2$ is a detection signal of a magnetic pole position of the rotation of the rotational electric machine MG1 and is detected by a magnetic pole position sensor such as a resolver, an encoder, a Hole element, a Hole IC or the like.

The motor control unit MCU calculates voltage control values on the basis of the input signals and outputs, to the driving circuit devices DCU1, DCU2, the voltage control value as control signals (a PWM signal (a pulse width modulation signal)) for operating the power semiconductor device Tpu1 to Tnw1, Tpu2 to Tnw2 of the power modules PMU1, PMU2.

The PWM signals that are output by the motor control unit MCU are generally designed such that hourly-averaged voltage has a sine wave. In this case, the instantaneous maximum output voltage is the voltage of a direct current line, which is an input of the inverter. Therefore, if the voltage of the sine wave is output, its effective value is $1/\sqrt{2}$. Thus, in the hybrid electric vehicle of the present invention, the effective value of the input voltage of the motor is increased in order to further increase the output of the motor by the limited inverter device. Specifically, the PWM signal of the MCU is made to have only ON and OFF in square-wave form. In this way, the wave-height value of the square-wave is voltage Vdc of the direct current line of the inverter and its effective value is Vdc. This is a method for maximizing the voltage effective value.

However, the square-wave voltage has small inductance in a low rotation speed range, which leads to a problem with a turbulent current waveform. This allows the motor to produce unnecessary excitation force, which makes noises. Thus, the square-wave voltage control is used only during high-speed rotation, whereas the usual PWM control is exercised in low-frequencies.

Subsequently, a specific configuration of the rotational electric machines MG (MG1 or MG2, or both of MG1 and MG2) according to the present invention will be explained with reference to FIG. 3 to FIG. 6.

FIG. 3 to FIG. 6 are top views and a partially enlarged view illustrating the rotational electric machine MG according to an embodiment of the present invention. The same elements are denoted with the same reference numerals. In the present embodiment, a case where a three-phase permanent magnet type rotational electric machine is used as the rotational electric machine MG will be explained as an example. It should be noted that the rotational electric machine MG may have the same configuration as any one of the rotational electric machines MG1, MG2, and the rotational electric machine MG1 may be configured as the permanent magnet type rotational electric machine, and the rotational electric machine MG2 may be configured as a rotational electric machine of other method such as an induction motor or a synchronous reluctance motor.

Figure 3:
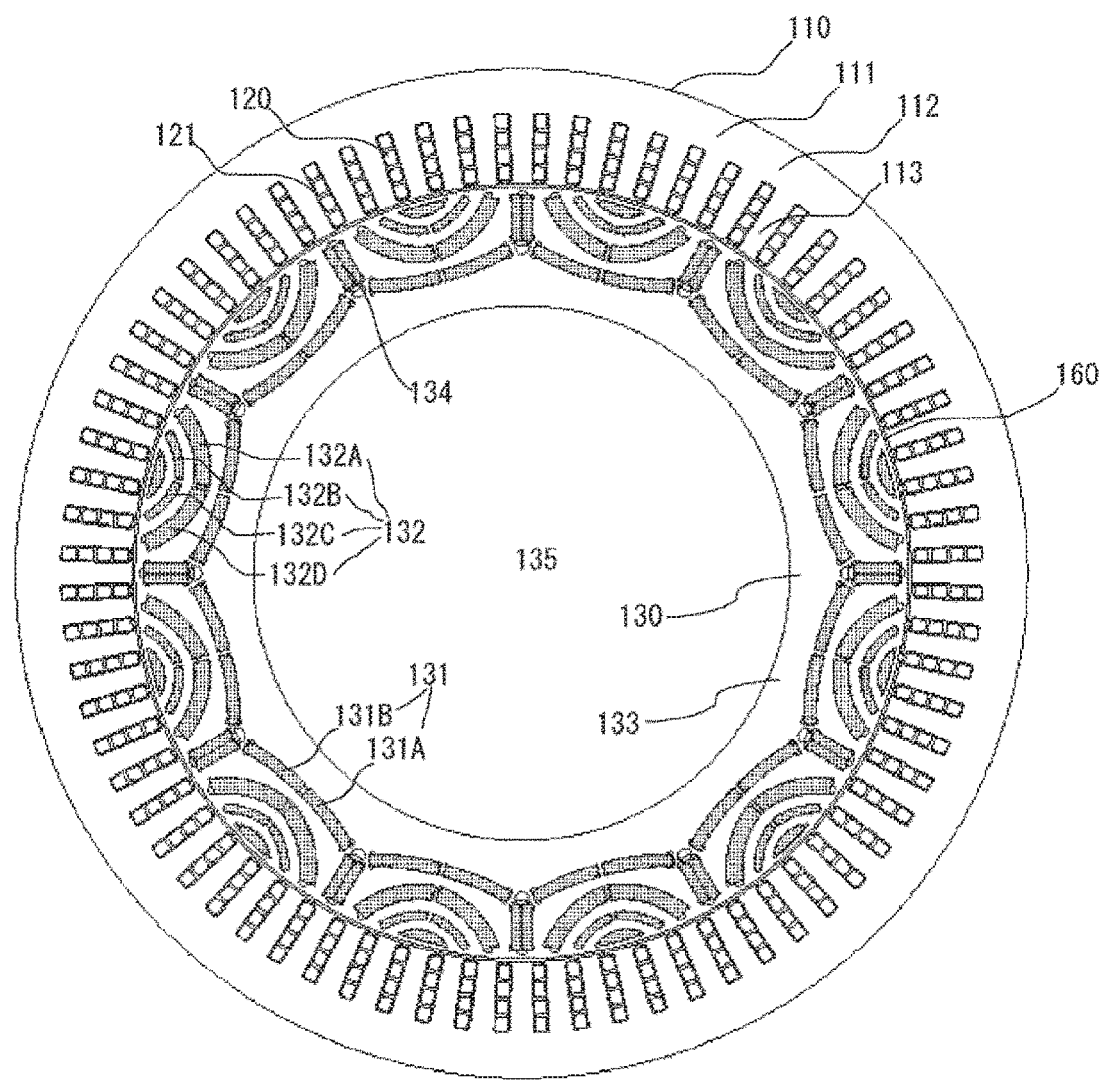
FIG. 3 is a cross sectional structural drawing illustrating a permanent magnet type rotational electric machine according to an embodiment of the present invention.
Figure 4:
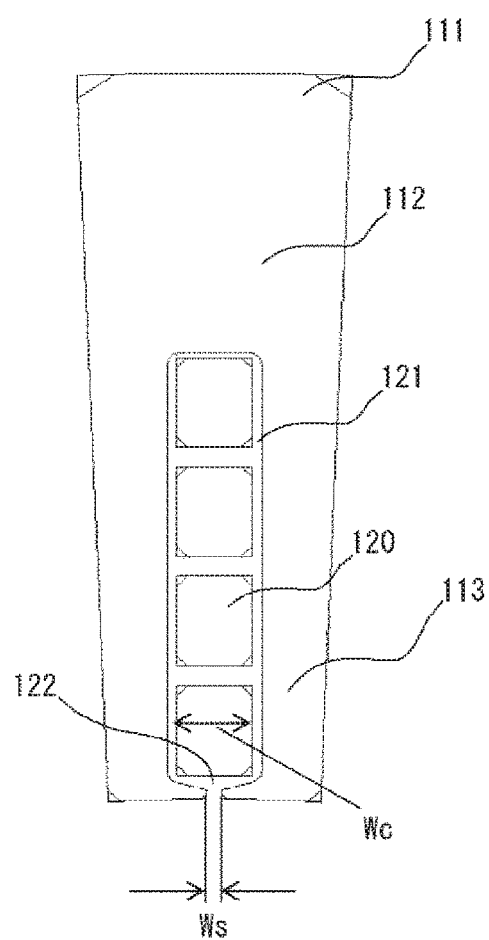
FIG. 4 is a partially enlarged view illustrating a stator slot structure of a permanent magnet type rotational electric machine according to an embodiment of the present invention.
Figure 5:
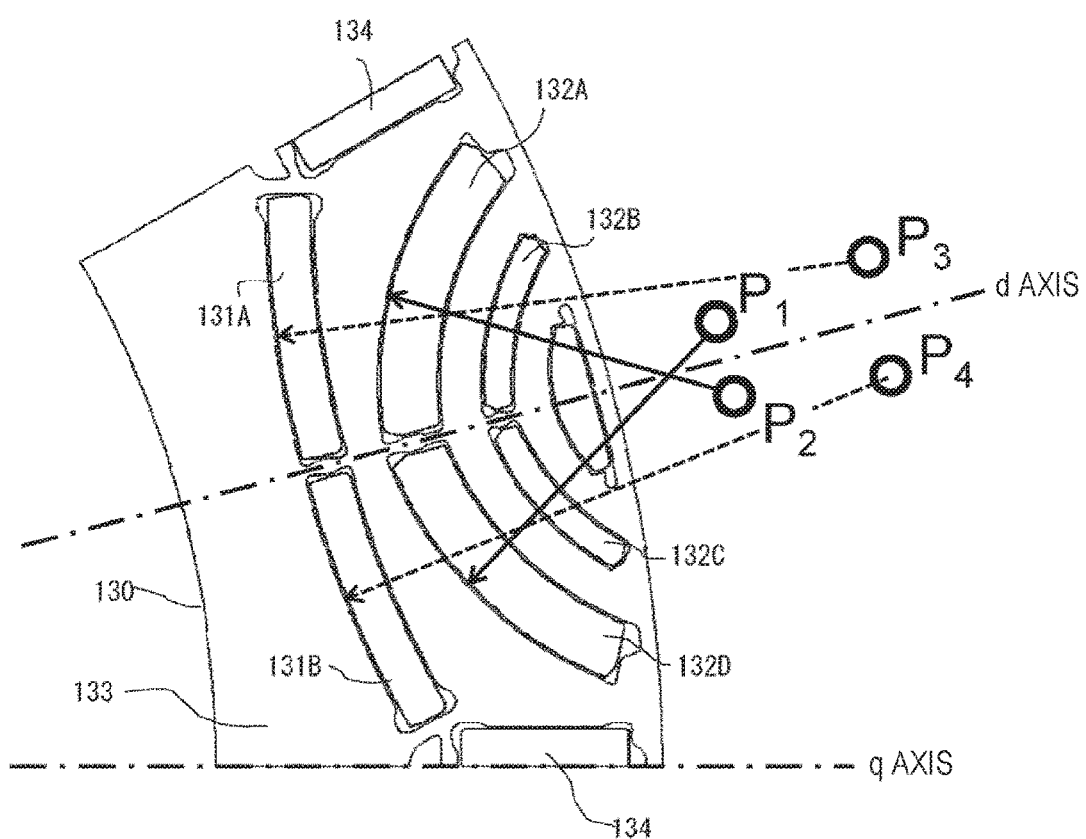
FIG. 5 is a partially enlarged view illustrating a rotor cross sectional structure of a permanent magnet type rotational electric machine according to an embodiment of the present invention.

As illustrated in FIG. 3 to FIG. 5, the rotational electric machine MG has a stator 110 adapted to generate a rotating field and a rotor 130 which is rotated by magnetic action with the stator 110 and is disposed for rotation with a gap 160 defined in cooperation with the inner circumferential side of the stator 110.

The stator 110 has a stator core 111 composed of a core back 112 and teeth 113; and stator slots 121 into which stator winding wires 120 are inserted. The stator winding wires 120 generate magnetic flux through energization.

The stator core 111 is formed by axially stacking a plurality of plate-like formed members formed by punching a plate-like magnetic member. Incidentally, the axial direction means a direction extending along the rotation axis of the rotor.

As illustrated in FIG. 3 and FIG. 4, the stator winding wires 120 are embedded in the stator slots 121, but the winding pitch of the winding wire is in a fractional pitch winding of which pitch is smaller than the magnetic pole pitch (not shown). The stator slot 121 has a stator slot opening portion 123. A peripheral direction width Ws of this opening portion is sufficiently smaller than a peripheral direction width Wc of the stator winding wire 120. In this case, the stator winding wire 120 shown in the drawings is a rectangular wire, but the stator winding wire 120 may be a flat wire or a circular wire.

As illustrated in FIG. 3 and FIG. 5, the rotor 130 includes a rotor core 133 constituting a magnetic path at a rotation side, a third permanent magnet 134, a first permanent magnet pair 131, a second permanent magnet pair 132, and a shaft 135 serving as a rotation axis.

In FIG. 3 and FIG. 5, the first permanent magnet pair 131 is a magnet pair, constituted by permanent magnets 131A, 131B, of which inner and outer diameters are formed with an arch shape and is in a Japanese tile shape. The permanent magnet 131A is formed in an arch of which center point is P3, and the permanent magnet 131B is formed in an arch of which center point is P4. More specifically, the permanent magnet group constituting the first permanent magnet pair 131 is configured such that a line connecting each of the arcs and the center point thereof does not cross d axis.

In FIG. 3 and FIG. 5, the second permanent magnet pair 132 is a magnet pair, constituted by permanent magnets 132A to 132D, of which inner and outer diameters are formed with an arch shape and is in a Japanese tile shape. The permanent magnets 132A, 132B are formed in an arch of which center point is P2, and the permanent magnets 132C, 132D are formed in an arch of which center point is P1. More specifically, the permanent magnet group constituting the second permanent magnet pair 132 is configured such that a line connecting each of the arcs and the center point thereof crosses d axis.

In this case, the third permanent magnet 134 is in a rectangular shape, and is arranged on q axis and is magnetized in a direction perpendicular to q axis. The permanent magnet 134 as illustrated in the drawing is divided from the magnet having a magnetic pole adjacent on q axis, but when the permanent magnet 134 and the adjacent magnet are made with a single magnet, the number of components can be reduced.

The materials of the permanent magnets 131, 132, 134 described in FIG. 3 and FIG. 5 may be made of ferrite magnets which are readily available, or may be configured by applying a rare earth magnet in which the amount of dysprosium is reduced, or by applying a bond magnet. In any case, the risk of resource depletion of the dysprosium can be reduced.

A case where the above configuration is employed will be explained as follows.

In order to ensure a peak torque in an electric vehicle provided with a permanent magnet type rotational electric machine driving system, for example, the following means may be used: ensuring the magnet torque by improving the amount of magnetic flux of the permanent magnet; ensuring the reluctance torque by making a magnet arrangement so as to increase the difference between d axis inductance and q axis inductance; and increasing the armature electric current.

In this case, the increase in the armature electric current will result in not only the increase in the loss of the rotational electric machine but also the increase in the loss of the inverter, and therefore, it is preferable to operate only in a temporary manner rather than routine use. Therefore, it can be said that it is preferable to employ a method of improving the amount of magnetic flux of the permanent magnet and improving the reluctance torque.

In the present invention, in view of this principle, as illustrated in FIG. 3 to FIG. 5, the first, second, third permanent magnet pairs 131, 132, 134 arranged in the rotor iron core 130 are arranged in a predetermined configuration.

More specifically, the third permanent magnet 134 is in a rectangular shape, and is arranged on q axis and is magnetized in a direction perpendicular to q axis. The first permanent magnet pair 131 constituted by the permanent magnets 131A, 131B is a magnet pair of which inner and outer diameters are formed with an arch shape and is in a Japanese tile shape. The permanent magnet 131A is formed in an arch of which center point is P3, and the permanent magnet 131B is formed in an arch of which center point is P4. More specifically, the permanent magnet group constituting the first permanent magnet pair 131 is configured such that a line connecting each of the arcs and the center point thereof does not cross d axis.

The permanent magnet group constituted by the third permanent magnet 134 and the first permanent magnet pair 131 forms a magnet arrangement having a substantially bath tub shape at the innermost diameter side of the rotor 130. The amount of magnetic flux of the permanent magnet for a single magnetic pole of the rotor can be ensured in proportional to the surface area of the permanent magnet. Therefore, since the bath tub configuration formed by the permanent magnet 134 and the permanent magnet pair 131 is employed, the permanent magnet can have a large surface area, and the amount of magnetic flux of the permanent magnet for a single magnetic pole can be ensured.

Subsequently, the second permanent magnet pair 132 constituted by the permanent magnets 132A to 132D is located at the outer diameter side of the rotor 130, and is a magnet pair of which inner and outer diameters are formed with an arch shape and is in a Japanese tile shape. The permanent magnets 132A, 132B are formed in an arch of which center point is P2, and the permanent magnets 132C, 132D are formed in an arch of which center point is P1. More specifically, the permanent magnet group constituting the second permanent magnet pair 132 is configured such that a line connecting each of the arcs and the center point thereof crosses d axis.

Originally, the magnetic flux of the permanent magnet is preferred to be basically concentrated on d axis as described in PTL 1. However, as a result of an experiment, it became clear that, in a case where a magnet material such as a ferrite magnet having a much lower magnetic energy product than the rare earth magnet is applied, the magnet magnetic flux is dispersed and cannot be sufficiently converged when a mechanical magnetic domain orientation is simply oriented in d axis.

Therefore, as illustrated in FIG. 5, the permanent magnet group constituting the second permanent magnet pair 132 is configured such that a line connecting each of the arcs and the center point thereof crosses d axis, so that this can suppress the dispersion of the magnet magnetic flux, and can cause the magnet magnetic flux to be concentrated on d axis. As a result, the amount of magnetic flux of the permanent magnet ensured by the third permanent magnet 134 and the first permanent magnet 131 and the amount of magnetic flux of the permanent magnet made by the second permanent magnet pair 132, and therefore, the amount of magnetic flux of the permanent magnet for a single magnetic pole can be improved, and the torque characteristics can be ensured.

It should be noted the second permanent magnet pair 132 has a two-layer configuration that includes a layer made of the permanent magnets 132A and 132D and a layer made of the permanent magnets 132B and 132C, but this is for the purpose of increasing the difference between the d axis inductance and the q axis inductance and improving the reluctance torque, but the second permanent magnet pair 132 may have a single layer of only the permanent magnet pairs 132A and 132D or only the permanent magnet pairs 132B and 132C, and in this case, there is an advantage in that, e.g., the number of components can be reduced, and therefore, a selection may be made in accordance with the specification of the rotational electric machine MG.

As illustrated in FIG. 4, the peripheral direction width Ws of the stator slot opening portion 122 is reduced to be equal to or less than a width size of the stator winding wire 120. This is a method for causing the equivalent gap length to be as short as possible and ensuring the permanent magnet magnetic flux as much as possible, but it may be configured to be as wide as the peripheral direction width of the slot 121, and may be configured so that the stator winding wire 120 can be inserted from the inner diameter side of the stator core 111, and in this case, the stator 110 can be easily assembled, or on the contrary, when the configuration may be made while the slot opening portion 122 is completely closed, the harmonic magnetic flux component caused by the slot opening portion 122 can be suppressed, and this can contribute to reduction of the vibration and noises. In any case, a selection may be made in accordance with the specification of the rotational electric machine MG.

Figure 6:
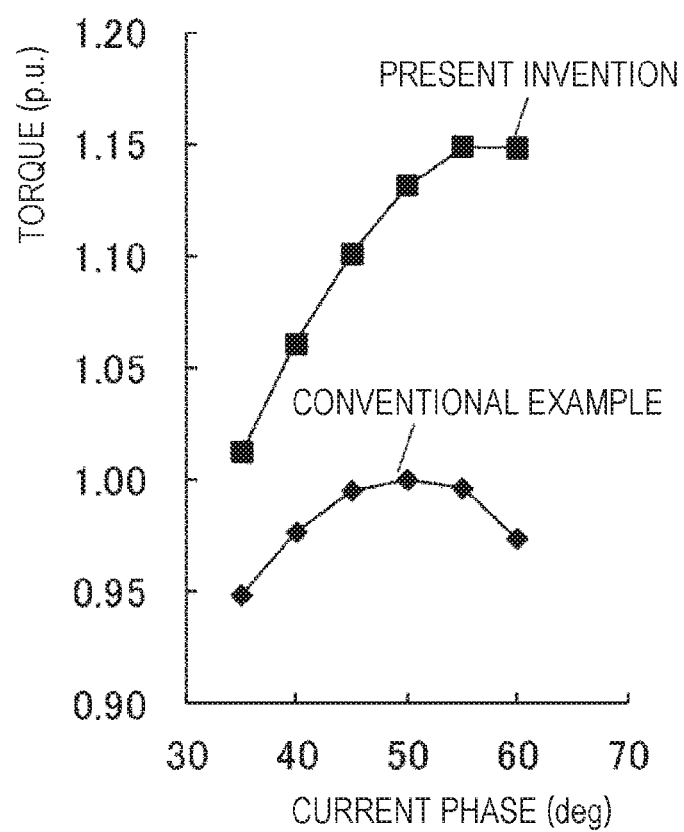
FIG. 6 is a measurement result in which a torque according to the present invention is compared with a conventional example.

The torque of the case having the configuration as described above is measured, and a result obtained by comparing a conventional example (an arrangement structure, not shown, in which the magnetic domain orientation of the permanent magnet is mechanically concentrated on d axis) is shown in FIG. 6. In the drawing, the electric current phase in the horizontal axis represents an angle formed by an armature electric current vector and an induced electromotive force vector generated by the permanent magnet, and when the angle becomes larger, a negative d axis electric current component increases. The torque in the vertical axis is indicated on the basis of that the peak torque of the conventional example is 1.0.

As illustrated in FIG. 6, as compared with the conventional example, the torque according to the present invention has improved has been improved in any of the conditions of the electric current phases, and it is confirmed that, in particular, as the electric current phase increases, the improvement of the torque has been accelerated.

In the present embodiment, the permanent magnets constituted by the first and second permanent magnet pairs are configured so that the axial direction cross section thereof is in a Japanese tile shape, i.e., both of inner and outer diameters are formed with an arch shape, but at least one side may be in an arc shape. For example, the effects described in the present embodiment can also be obtained even when the axial direction cross section is in a semicylindrical shape, i.e., an outer side is a straight line shape, and an inner diameter side is in an arc shape.

The magnetic domain orientation of the permanent magnet may be configured to have a radial orientation, and in this case, the axial direction cross section of the permanent magnet may be formed in a rectangular shape. In this case, the first permanent magnet pair may be configured so that the magnetic domain orientation focal point of the permanent magnet does not cross d axis, and the second permanent magnet pair may be configured so that the magnetic domain orientation focal point in the radial orientation of the permanent magnet crosses d axis.

Second Embodiment

Figure 7:
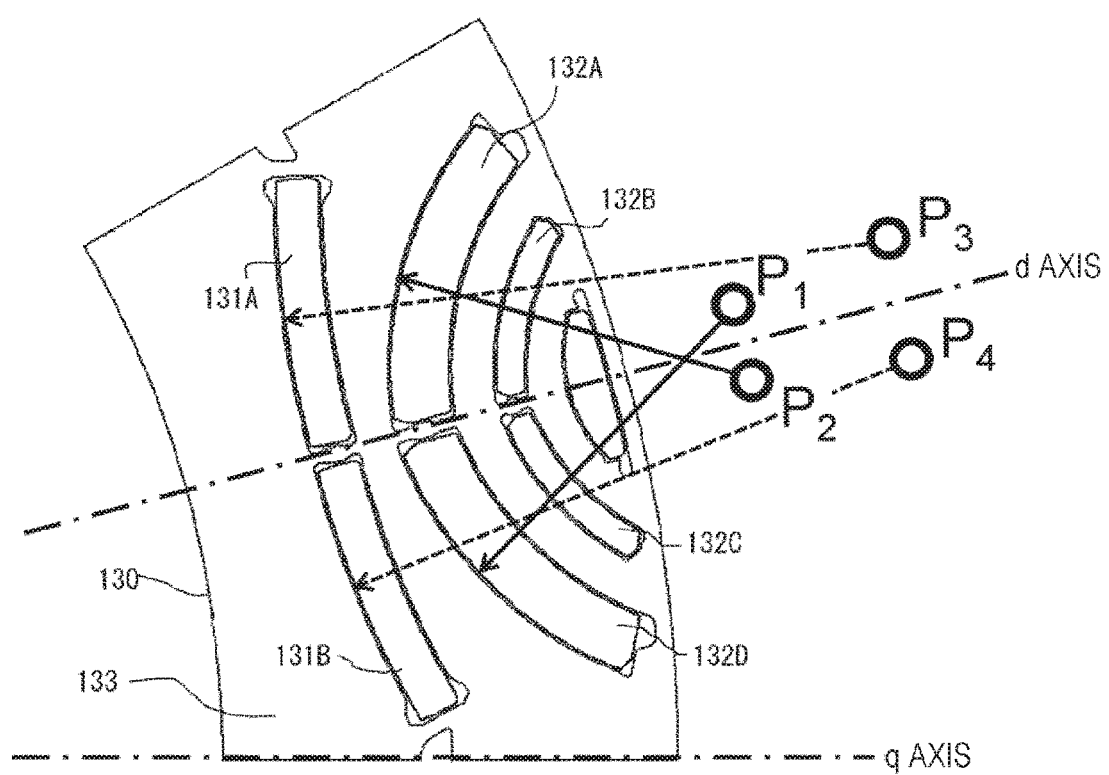
FIG. 7 is a partially enlarged view illustrating a rotor structure of a permanent magnet type rotational electric machine according to another embodiment of the present invention.

FIG. 7 illustrates a partially enlarged view of a rotor cross section illustrating another embodiment of the present invention, and the same objects as those in FIG. 5 are denoted with the same reference numerals.

The drawing in FIG. 7 is different from FIG. 5 in that the third permanent magnet 134 is eliminated, and the configuration is made with only a first permanent magnet pair 131 and a second permanent magnet pair 132.

According to this configuration, the torque characteristics are lower than that in FIG. 5, but in contrast to the configuration based on the design concept that the magnet magnetic flux is mechanically concentrated on d axis, an effect of improving the amount of magnetic flux of the permanent magnet can be obtained, and in addition, the number of components can be reduced, and a space into which a magnet is inserted in a q axis portion is made with a magnetic steel sheet, and therefore, the mechanical strength against the centrifugal force of the rotator core can be improved.

It should be noted that the present invention is not limited to the above embodiments, and includes various modifications thereof. For example, the above embodiments are provided to explain the present invention in details so that the present invention can be easily understood, and is not necessarily limited to those having all of the elements explained. Some of the elements in any given embodiment may be deleted or replaced with elements in another embodiment, or elements in another embodiment may be added to the configuration in any given embodiment. Some of the elements in each embodiment may be added to other elements, or may be deleted or replaced with other elements.

REFERENCE SIGNS LIST 110 stator
111 stator core
112 core back
113 teeth
120 stator winding wire
121 stator slot
122 stator slot opening portion
130 rotator
131 first permanent magnet pair
132 second permanent magnet pair
133 rotator core
134 third permanent magnet
135 shaft
136 rotator slot opening portion
160 gap (air gap)

The invention claimed is:

1. A rotator for a permanent magnet type rotational electric machine, the rotator comprising:
a plurality of permanent magnets, having at least one side in an axial direction cross section formed in an arc shape,
wherein a center axis of a magnetic pole of the plurality of permanent magnets is denoted as d axis, and an axis that is 90 degrees from the d axis in an electrical angle is denoted as q axis, and
the plurality of permanent magnets includes
a first permanent magnet pair, including an arc-shaped first permanent magnet having a first center point and an arc-shaped second permanent magnet having a second center point that is different from the first center point, in which a first line connecting the first center point to a center of the arc-shaped first permanent magnet and a second line connecting the second center point to a center of the arc-shaped second permanent magnet do not cross the d axis, and
a second permanent magnet pair, including an arc-shaped third permanent magnet having a third center point and an arc-shaped fourth permanent magnet having a fourth center point that is different from the third center point, in which a third line connecting the third center point to a center of the arc-shaped third permanent magnet and a fourth line connecting the fourth center point to a center of the arc-shaped fourth permanent magnet cross the d axis.

2. The rotator according to claim 1, wherein on the q axis, a q axis third permanent magnet which is magnetized in a direction perpendicular to the q axis and of which axial direction cross section shape is a rectangular shape is inserted, and
the first permanent magnet pair and the second permanent magnet pair are provided between the q axis third permanent magnet and another third permanent magnet.

3. The rotator according to claim 1, wherein the at least one permanent magnet is formed in an arc shape in which both of inner and outer diameters are formed with the arc shape.

4. The rotator according to claim 1, wherein the at least one permanent magnet is formed in a semicylindrical shape.

5. A permanent magnet type rotational electric machine comprising:
a stator iron core and stator slots provided with an equal interval in a peripheral direction of the stator iron core; and
a stator winding accommodated in the stator slot and having a stator winding wire generating a rotation magnetic field, and a rotator rotatably supported with a gap from the stator,
wherein the rotator is the rotator according to claim 1,
a peripheral direction width in an opening portion of the stator slot is configured to be smaller than a peripheral direction width of the stator winding wire.

6. The permanent magnet type rotational electric machine according to claim 5, wherein a winding pitch of the stator winding wire is configured to be less than a magnetic pole pitch.

7. An electric drive system comprising:
a battery providing an electric power and a rotational electric machine outputting a driving torque using the provided electric power; and
a control device controlling the driving torque,
wherein the rotational electric machine is the permanent magnet type rotational electric machine according to claim 1.

8. An electric vehicle using an electric drive system including a battery providing an electric power, a rotational electric machine outputting a driving torque using the provided electric power, and a control device controlling the driving torque,
wherein the electric drive system is the electric drive system according to claim 7.

* * * * *